United States Patent [19]

DeLuca, Jr.

[11] Patent Number: 5,091,011
[45] Date of Patent: Feb. 25, 1992

[54] LIGHT AND MOISTURE RESISTANT METAL OXIDE-COATED MICA PIGMENTS

[75] Inventor: Carmine V. DeLuca, Jr., Peekskill, N.Y.

[73] Assignee: The Mearl Corporation, Ossining, N.Y.

[21] Appl. No.: 491,728

[22] Filed: Mar. 12, 1990

[51] Int. Cl.$^5$ .......................................... C04B 14/20
[52] U.S. Cl. .................................... 106/417; 106/418
[58] Field of Search ................ 428/363, 402; 106/417, 106/418

[56] References Cited

U.S. PATENT DOCUMENTS

| | | | |
|---|---|---|---|
| 3,087,828 | 4/1963 | Linton | 106/418 |
| 4,146,403 | 3/1979 | Armanini et al. | 106/418 |
| 4,494,993 | 1/1985 | Bernhard et al. | 106/417 |
| 4,552,593 | 11/1985 | Ostertag | 106/417 |

*Primary Examiner*—Mark L. Bell
*Assistant Examiner*—Deborah Jones
*Attorney, Agent, or Firm*—Ostrolenk, Faber, Gerb & Soffen

[57] ABSTRACT

Metal oxide coated mica pigments are provided with enhanced light and moisture stability by providing on the particle surfaces a coating of hydrous aluminum oxide.

4 Claims, No Drawings

LIGHT AND MOISTURE RESISTANT METAL OXIDE-COATED MICA PIGMENTS

BACKGROUND OF THE INVENTION

Nacreous pigments comprising metal oxide-coated mica platelets are now in common use to produce pearlescent luster, metallic luster, and multicolor effects approaching iridescence. The pigments were first described in Linton U.S. Pat. Nos. 3,087,828 and 3,087,829 A description of their properties is included in Pigment Handbook, Volume I, Second Edition pp. 829–858, John Wiley and Sons, N.Y., 1988.

The oxide coating is in the form of a thin film deposited on the surfaces of the mica particle. The oxides in most widespread use at present are titanium dioxides and iron oxides Others are tin oxides, chromium oxides, and zirconium oxides. Mixtures or combinations of the oxides are also used.

The coatings have the optical properties of thin films; thus the color reflected by the pigment arises from light interference which is dependent on he thickness of the coating. Thin $TiO_2$ coatings produce a whitish reflection which appears pearly or silvery. Reflection colors of gold, red, blue, green, etc. are produced by using progressively thicker coatings.

Since $Fe_2O_3$ has an inherent red color, mica coated with this oxide has both a reflection color and an absorption color, the former from interference, the latter from absorption of light. The iron oxide-coated mica pigments of greatest commercial interest at present contain iron(III) oxide and have reflection colors ranging from yellow to red. The pigments are referred to as "bronze," "copper," "russet,", etc.

For extended use in outdoor applications, such as automotive paints, many types of pigments require treatment so that the paint film in which they are used can resist the effects of ultraviolet light and moisture. Conventional pigmentary titanium dioxide has been stabilized with compounds of, for example, silica, aluminum, chromium, zinc, zirconium, and various mixtures. Similarly, the metal oxide-coated mica pigments require stabilization. However, the behavior of an oxide coated on mica differs from that of the free oxide pigment, as discussed in DeLuca et al., U.S. Pat. No. 4,038,099, column 3, lines 19 to 45. Differences also arise because conventional pigmentary titanium dioxide usually has a crystal size of about 0.2 $\mu$m, whereas metal oxide-coated mica particles are thin platelets which may have lengths from 2 to 200 $\mu$m, depending on the intended application. Experience in stabilizing conventional pigments is therefore not directly applicable to metal oxide-coated mica pigments.

Metal oxide-mica pigments have been successfully stabilized for outdoor use by deposition of a further coating of a chromium compound Chromic hydroxide was used in Rieger et al , U.S. Pat. No. 4,134,776, and methylacrylatochromic chloride in Jackson, U.S. Pat. No. 3,832,208. The rutile form of titanium dioxide is preferred for exterior grades of $TiO_2$-coated mica. The preparation of rutile-coated mica is described in U.S. Pat. No. 4,038,099.

An inherent disadvantage of the chromium treatment is the greenish color which it imparts, detracting to some extent from the purity of the interference and absorption colors of the pigments. That disadvantage has now been overcome by stabilizing metal oxide-coated mica pigments with hydrous aluminum oxide.

Metal oxide-coated mica pigments have previously been treated with aluminum as part of other processes and for other purposes. In Bernhard U.S Pat. No. 4,323,554, for example, aluminum hydroxide is precipitated onto metal oxide-coated mica in the presence of an organic compound and further treated with a dye to produce pigments coated with an aluminum lake.

Bernhard U.S. Pat. No. 4,490,179 teaches that a metal oxide-coated mica pigment can be made hydrophobic by coating with aluminum or chromic hydroxide followed by a carboxylic acid which bonds to the surface.

In spite of the number of investigations of the use of aluminum with metal oxide-coated mica, none has been devoted to deposition of a simple coating of hydrated aluminum oxide to effect stabilization against light and moisture.

It was therefore surprising to discover that such a coating increases resistance to ultraviolet light and moisture, making possible exterior grade mica pigments. Hydrous aluminum oxide has many advantages for this purpose: it is non-toxic, economical, and free of color.

The products of the invention are suitable for outdoor exposure and for applications in which light, moisture, or both may be encountered. They are especially useful for automotive finishes, paint on outdoor furniture, coil coatings, and incorporation in plastic signs, vinyl tiles, and the like.

SUMMARY OF THE INVENTION

The object of the invention is to make available metal-oxide coated pigments stabilized against ultraviolet light and moisture without using chromium compounds. The stabilized pigments are suitable for exterior use, including automotive finishes.

The pigments are stabilized by the deposition of a protective coating comprising hydrous aluminum oxide, which is precipitated on the metal oxide-coated pigment from an aluminum compound in an aqueous medium.

DETAILED DISCUSSION

Metal oxide-coated mica pigment, which is sometimes referred to in the following as "mica pigment" or "substrate", is stabilized against ultraviolet light and moisture by a further coating of hydrous aluminum oxide. In one process, the mica pigment is conveniently dispersed by stirring in water. An aluminum compound and a neutralizing agent are then added simultaneously as aqueous solutions. The resulting hydrolysis of the aluminum salt causes the hydrous oxide to deposit on the substrate.

Suitable aluminum sources are aluminum chloride, aluminum- sulfate, and aluminum potassium sulfate. These may be neutralized by bases such as sodium hydroxide, potassium hydroxide, ammonia or a base source like urea.

In these depositions, the suspension is maintained at about 30° to 90° C., preferably about 40° to 80° C. The pH value is maintained at about 4.5 to 6.5, preferably about 5.0 to 6.0.

Alternatively, a basic aluminum compound may be used, such as sodium aluminate, and the pH maintained at 7.0 to 9.5, preferably at about 8.0 to 9.0, by the addition of an acid, such as hydrochloric acid or sulfuric acid. Suitable temperatures are ambient temperature up to about 80° C., preferably 20° to 65° C.

The concentration of aluminum compound and base or acid in the aqueous solution is not restricted and any convenient concentration can be used. The relative volumes of reagents is, of course, dependent on the values selected.

In either case, the aluminum compound must be added slowly enough to permit the formation of a smooth, continuous layer on the platelets. The rate should fall in the range of about 0.003 to 0.1 mg Al per minute per gram of mica pigment, preferably about 0.005 to 0.07 mg Al/min/g mica pigment.

The quantity of aluminum compound solution used is such as to produce a hydrous aluminum oxide coating containing about 0.05 to 1.2% Al, preferably about 0.1 to 0.8% Al, based on the total weight of the pigment.

The upper limit of Al concentration in the resulting pigment is significant. Normally, it is desirable to limit the quantity of an additional coating material in order to economize and to avoid diluting the pigmentary value. In the present invention concentrations of aluminum above 1 2% were less desirable for another reason as well; they were unexpectedly less effective in stabilization than lower concentrations. A possible explanation is that thicker hydrous aluminum oxide coatings may develop cracks on drying, thus providing less thorough protection for the platelet.

After deposition of the coating, the product is filtered, washed with water, and dried at any convenient temperature, for instance about 110° C. Temperature high enough to calcine the hydrous aluminum oxide should be avoided.

In the examples below, the pigments were tested in paint films on primed steel panels. The pigment was dispersed at 3% by weight in a thermosetting acrylic enamel (AT-56 of DuPont). The paint was applied by spraying and was cured at 121° C. for 30 minutes to produce a dry film about 25 $\mu$m thick.

Stability was evaluated in a waterbath test, a QCT humidity test, and a QUV ultraviolet test. In the waterbath test, the panel is half immersed vertically in water at 38° C. for 10 days. In the QCT test, the panels are partially protected by a mask and placed for 4 days in a Cleveland Humidity tester (Q-Panel Company, Cleveland, Ohio 44145) The panels are subjected each day to 23 hours of water condensation at 49° C. followed by 1 hour of dry off.

In the QUV test, masked panels in a QUV meter (Q-Panel Company) are subjected to 8 hours of exposure to UV-A radiation (351 nm lamps) at 66° C. and then to 4 hours of water condensation at 50° C. This cycle is repeated for a total of 8 weeks. The panels are examined visually for evidence of change in gloss, color, or both.

The hydrous aluminum oxide coating provides stability in each of the three tests, as is shown in the following examples.

EXAMPLE 1

A blue-reflecting rutile-coated mica pigment containing 53% $TiO_2$, 1% $SnO_2$, and 46% mica, with platelets primarily 5 to 40 $\mu$m in length, was the substrate. The substrate (250 g) was dispersed in 3.0 liters of distilled water and heated with stirring at 60° C. The pH value was adjusted to 5.5 with HCl. A solution of 2 91% (by weight) $AlCl_3.6H_2O$ (containing 3.3 mg Al/ml) was delivered at the rate of 4.0 ml/min for 57 minutes. Simultaneously, 3.5% NaOH solution was added to maintain the pH at 5.5. After stirring for an additional 15 minutes, the product was filtered, washed with distilled water, and dried at 110° C. The hydrous aluminum oxide content was 0.30% Al based on the total weight of the treated pigment.

The coated pigment was evaluated in the waterbath, QCT, and QUV tests previously described. The paint film showed no change in any of the tests.

As a control, the untreated blue-reflecting mica pigment was subject to the three test procedures. In this case, the waterbath test revealed some blistering, and there was some chalking in the QCT and QUV tests.

EXAMPLE 2

The procedure of Example 1 was followed, except that the pigment was red-reflecting ferric oxide-coated mica (48% $Fe_2O_3$) containing platelets primarily 5 to 40 $\mu$m in length. The aluminum chloride solution was added for 114 minutes. The product, after filtering, washing, and drying, contained hydrous oxide having 0.60% Al No change occurred on exposure to the three stability tests.

The untreated mica pigment was tested simultaneously. It showed slight fading of color in the waterbath, and slight chalking in the QCT and QUV tests.

EXAMPLE 3

The mica pigment was a white-reflecting rutile-coated mica (29% $TiO_2$, 1% $SnO_2$) containing platelets primarily 5–40 $\mu$m in length. The pigment (250 g) was suspended in 2.5 liters of water. A solution containing 4.4 mg Al/ml was prepared from $Al_2(SO_4)_3$ hydrate. The Al solution was added to the suspension at 70° C. for 70 minutes at the rate of 4 0 ml/min. The pH was maintained at 5.2 by simultaneous addition of 4 0% KOH solution. The product was filtered, washed, and dried at 110° C. The coated pigment contained hydrous aluminum oxide having 0.49% Al. It revealed no change in appearance in the three test procedures.

EXAMPLE 4

A bronze-reflecting iron oxide-coated mica (42% $Fe_2O_3$) with platelets primarily 5 to 25 $\mu$m in length was treated as in Example 1. The product contained hydrous aluminum oxide having 0.31% Al. It was unchanged in the three stability tests.

EXAMPLE 5

The blue-reflecting mica pigment of Example 1 (250 g) was dispersed in 1500 g water at 25° C. A solution of 2.9% sodium aluminate ($Na_2O.Al_2O_3.3H_2O$ ) was added for 50 minutes at the rate of 2 ml/min, maintaining the pH value at 8.5 by the simultaneous addition of 2 N HCl. After further stirring for 15 minutes, the product was filtered, washed with water, and dried at 120° C. The hydrous aluminum oxide coating contained 0.29% Al based on the weight of the total treated pigment. The product was unchanged in each of the three stability tests.

Various changes and modifications can be made in the product and process described hereinbefore without departing from the spirit and scope of the invention. The embodiments set forth were for the purpose of illustration only and were not intended to be limiting.

What is claimed is:

1. A metal oxide-coated mica pigment with enhanced light and moisture stability comprising metal oxide-coated mica particles having on the particle surfaces a coating of hydrous aluminum oxide in which the hydrous aluminum oxide layer contains a light and moisture stability effective amount in the range of about 0.1 to 0.8% Al deposited at a rate of 0.001–0.070 mg Al per minute per gram of pigment.

2. The pigment of claim 1 in which the mica pigment comprises ferric oxide-coated mica.

3. The pigment of claim 1 in which the mica pigment comprises titanium dioxide-coated mica.

4. The pigment of claim 3 in which the titanium dioxide is rutile $TiO_2$.

* * * * *